United States Patent [19]
Orimo et al.

[11] Patent Number: 5,564,120
[45] Date of Patent: Oct. 8, 1996

[54] DATA MANAGEMENT METHOD IN A DISTRIBUTED PROCESSING SYSTEM

[75] Inventors: Masayuki Orimo, Kawasaki; Kinji Mori, Machida; Shigeki Hirasawa, Kawasaki; Hiroshi Fujise, Yokohama; Masuyuki Takeuchi, Fujisawa; Hitoshi Suzuki, Owariasahi, all of Japan

[73] Assignee: Hitachi, Ltd., Tokyo, Japan

[21] Appl. No.: 441,645

[22] Filed: May 15, 1995

Related U.S. Application Data

[63] Continuation of Ser. No. 744,450, Aug. 13, 1991, abandoned.

[30] Foreign Application Priority Data

Aug. 15, 1990 [JP] Japan .................. 2-214262

[51] Int. Cl.⁶ .............. G06F 17/30; G06F 13/00; G06F 15/16
[52] U.S. Cl. .................. 395/600; 364/DIG. 1; 364/228.3; 364/282.1; 364/281.3; 364/270.7; 395/650
[58] Field of Search .............................. 395/600

[56] References Cited

U.S. PATENT DOCUMENTS

| | | | |
|---|---|---|---|
| 4,811,216 | 3/1989 | Bishop et al. | 364/200 |
| 4,823,256 | 4/1989 | Bishop et al. | 364/200 |
| 4,851,988 | 7/1989 | Trottier et al. | 364/200 |
| 4,901,231 | 2/1990 | Bishop et al. | 364/200 |
| 5,093,913 | 3/1992 | Bishop et al. | 395/650 |
| 5,155,729 | 10/1992 | Rysko et al. | 371/9.1 |
| 5,163,131 | 11/1992 | Row et al. | 395/200 |

*Primary Examiner*—Thomas G. Black
*Assistant Examiner*—Peter Y. Wong
*Attorney, Agent, or Firm*—Antonelli, Terry, Stout & Kraus

[57] ABSTRACT

A data management method in a distributed processing system having a plurality of processors connected through a common transmission line with at least one processor having at least one external device connected therewith, for sending to the common transmission line access commands issued to the external device by programs asynchronously executed in the programs as access messages; and wherein the processor having the external device connected therewith takes in any of the access messages related to the external device connected therewith from among the access messages asynchronously sent to the common transmission line by the programs, and the processor matches order of access to the external devices connected therewith among the received access messages.

7 Claims, 9 Drawing Sheets

DATA MANAGEMENT METHOD IN A DISTRIBUTED PROCESSING SYSTEM

This application is a Continuation application of Ser. No. 07/744,450, filed Aug. 13, 1991, which is now abandoned.

FIELD OF THE INVENTION

The present invention relates to a data management method for replication of programs in a distributed processing system having a plurality of processors connected through a network.

DESCRIPTION OF THE PRIOR ART

There has been conventionally used a dual standby redundant method where a program was made duplex with use of a master and slave processors to accomplish a non-stop distributed processing system having a plurality of processors integrated through a local area network (LAN). The method of the type mentioned, for example, in an article in the Reports of the Electronic Information Communications Association, July, 1987, pp 72–82, entitled "A Fault Tolerant Computer" included a tandem non-stop computer.

The prior program standby redundant method using the master and slave processors has to periodically send internal statuses of a master program to a slave program in execution in order for the standby slave program to resume processing of the main program in the event of a fault of the main processor. It is disadvantageous that an operator has to build commands necessary for sending internal statuses in the programs, and has to continue programming while being conscious of the non-stop operation. It is also a disadvantage that the existing programs cannot be used as they are.

SUMMARY OF THE INVENTION

An object of the present invention is to provide a data management method in a distributed processing system that can asynchronously execute replication of existing programs with a plurality of processors connected with a network.

Briefly, the foregoing object of the present invention is accomplished by a data management method comprising the following steps for processors.

(1) Taking in an access command to an external device, such as a disk drive, issued by a user program (hereinafter referred to as the UP) being executed by the processor, and creating and broadcasting a message to the network.

(2) Delaying the UP having issued the access command in step (1) above, and taking in and giving to the UP a response message for the message broadcasted to the network in step (1) to release the wait status.

(3) A processor having external devices, such as a disk drive, judging an access message of the UP being executed in duplicate from among the access messages to any of the external devices connected therewith, and matching the response messages to the access messages.

The present invention has the advantage that any of the existing UP's can be executed in duplicate by a plurality of processors wherein the access command of the existing UP of any of the external devices, such as the disk drive, can be automatically broadcasted to the network as stated in steps (1) and (2) above, and that the processor having the external devices connected therewith can take in the access messages to the external devices connected therewith from the network to check for redundancy among them.

DETAILED DESCRIPTION OF THE EMBODIMENTS

Figure 1:
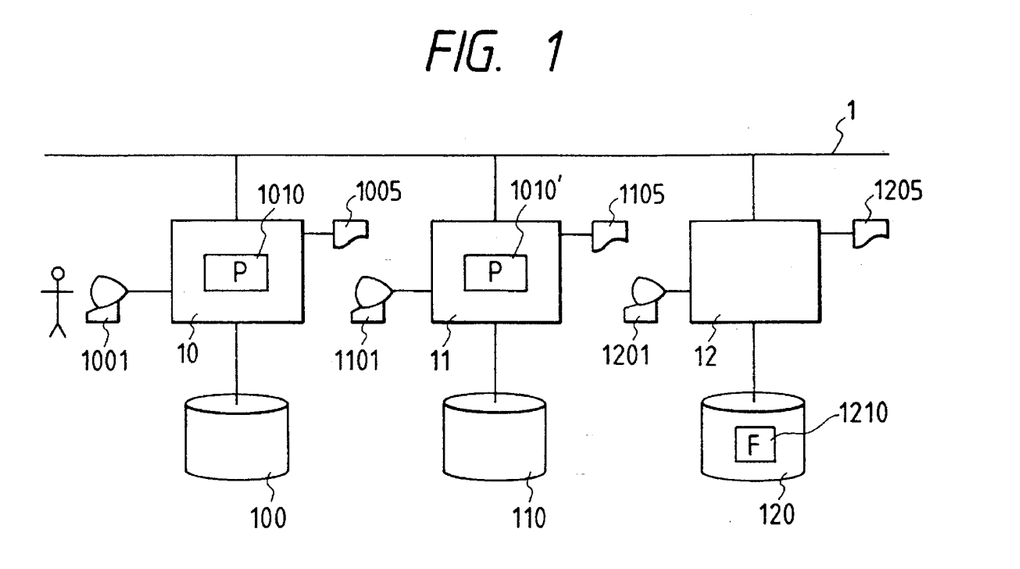
FIG. 1 is an overall system configuration for accomplishing the present invention.

The present invention is illustrated in further detail by reference to the accompanying drawings. FIG. 1 is a system configuration according to the present invention. In the figure are shown processors 10, 11, 12, and so forth. Each of the processors has the respective terminals 1001, 1101, 1201, and so forth, disk drives 100, 110, 120, and so forth, and printers 1005, 1105, 1205, and so forth connected thereto. The processors have their respective specific numbers (processor numbers) labeled thereto, and are connected to a network 1. For the purpose of illustration only, the present embodiment uses a bus network. Of course, the present embodiment is not limited to the bus network, but rather can use any type of network. Also, each of the processors can have pluralities of terminals, disk drives, and printers. Further, the processors may also have no terminals and printers connected thereto.

Also, FIG. 1 shows an example of replication of programs using a plurality of processors. The two processors 10 and 11 execute the same programs 1010 and 1010' in an asynchronous way, respectively. In accordance with the present invention, the replicated programs P 1010 and 1010' can access the disk drive, terminal, or printer without being aware of each other. This feature allows the programs P to continue execution even if one of the processors 10 or 11 breaks down in the system shown in FIG. 1. It should be noted that the present invention assumes that the programs and files are labeled with logical names which do not depend on any of the processors, disk drives, and other similar physical locations in which they are stored. The logical names are the same for identical programs and files. For example, the logical names are the same as for the programs 1010 and 1010'.

Figure 2:
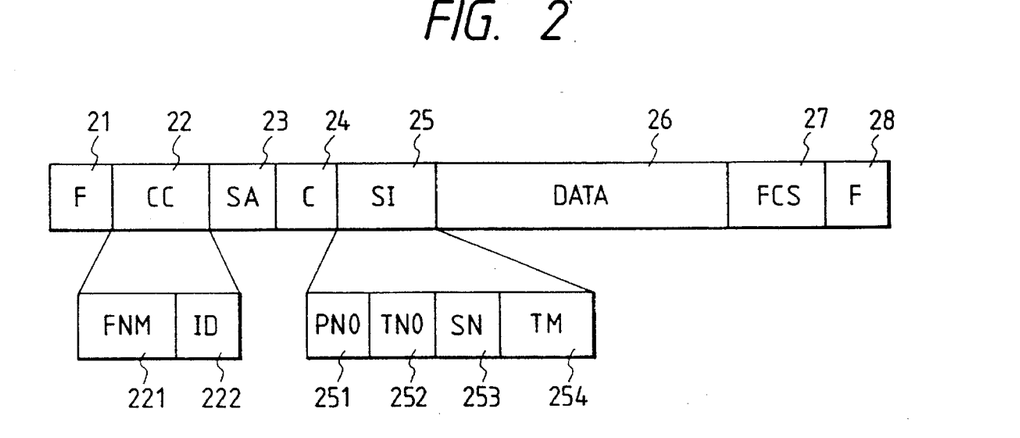
FIG. 2 is an example of a message format for the present invention.

FIG. 2 is a format for a message sent on the network. F 21 and F 28 denote a beginning flag and an end flag of the message, respectively. CC 22 denotes a content code for the message. CC 22 comprises an FNM part 221 indicating contents to be accessed and an ID 222 indicating a kind of message, such as an access request or access response. The FNM part has a setting of a file name for a file to access, a program name of a program started and accessed by a terminal, or a code for a printer to access.

SA 23 is a source address for storing a processor number of a processor having generated the message. C 24 is a serial number needed for transmission. SI 25 is a source information part for indicating a source of the message. The SI 25 comprises a processor number part PNO 251, a task number part 252, a serial number part 253, and a time part 254. Data 26 is a part for storing information to be sent. FCS 27 is a part for checking for transmission error.

Figure 3:
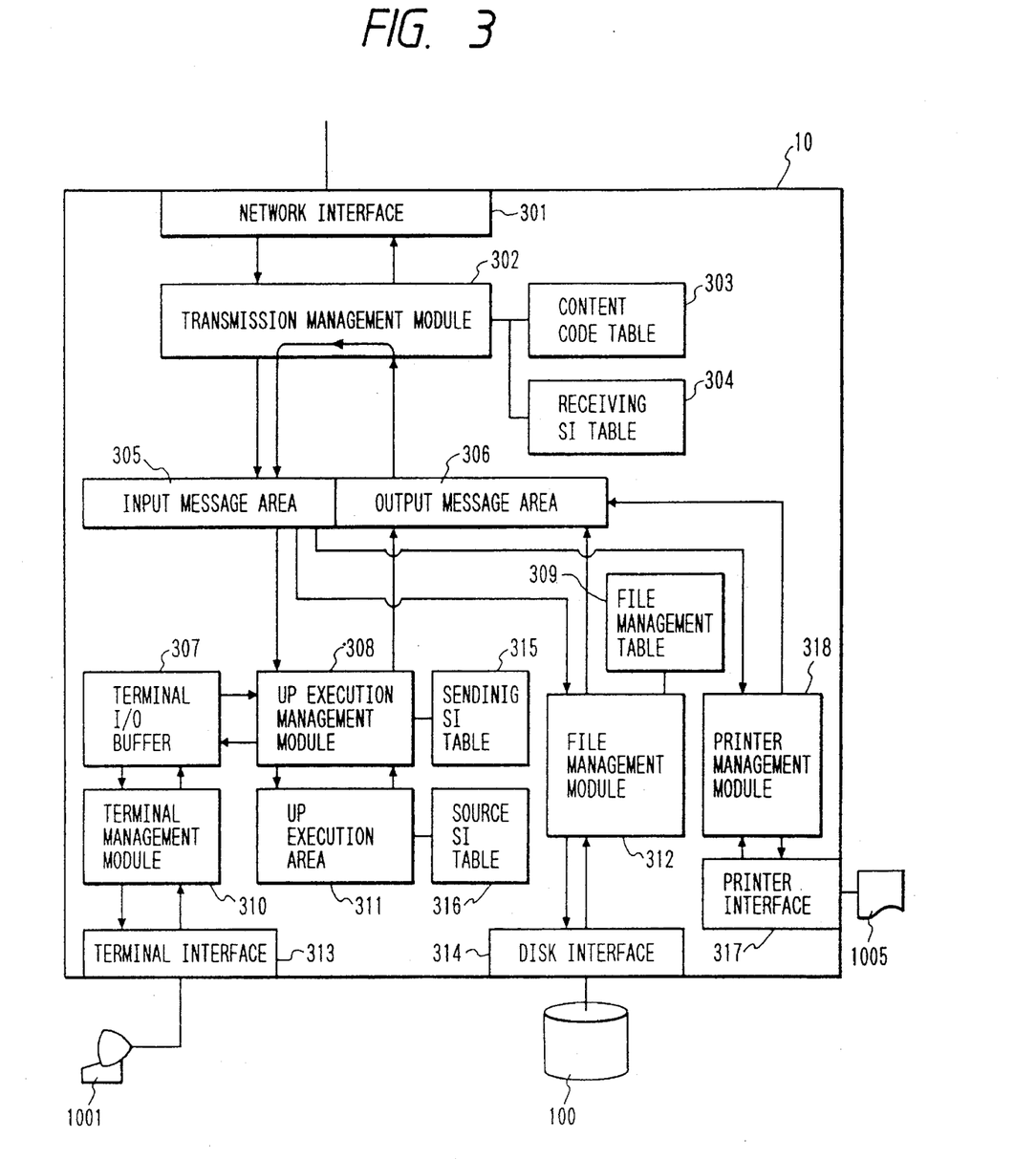
FIG. 3 is an example of a module construction for the present invention.

FIG. 3 is a configuration of modules and tables in the processor 10 shown in FIG. 1. The processors 11, 12, and so forth are also made up of the same configuration. A network interface 301, a terminal interface 313, a disk interface 314, and a printer interface 317 are interface modules for the network 1, the terminal 1001, the disk drive 100, and the printer 1005, respectively. A transmission management module 302 judges whether a message received from the network is needed for the respective processor on the basis of the contents in CC 22 (FIG. 2) of the message. If the received message is necessary, the transmission management module stores it in an input message area 305. The transmission management module 302 also broadcasts a message in an output message area 306 to the network through the network interface 301. The transmission management module also judges whether the sent message is needed for the respective processor, as it does for the received message. If the sent message is necessary, the transmission management module stores it in an input message area 305. Storing the received message in the input message area 305 and the sent message in the output message area 306 enable the messages to respond to content code. A content code table 303 registers the applicable content code to files in the disk drive connected to its own respective processor, the content code applicable to the programs, and the contents code applicable to the printer connected to its own respective processor. In other words, the FNM part 221 shown in FIG. 2 has, for example, a file name, a program name, and a code applicable to the printer set therein. The ID part 22 has the content code registered therein which has an "access request" code set therein. These content codes are automatically set when the processor is started or when a new file or program is added to the processor. The transmission management module compares the CC 22 of the received message with the CC 22 in the content code table, and retains the coincident message for itself.

A receiving SI table 304 is a table for storing contents of the SI 25 (FIG. 2) of the received message with the CC 22 response. A terminal management module 310 stores data input from the terminal 1001 into a terminal I/O buffer 307. At the same time, data in the buffer is output through the terminal interface 313 to the terminal for display.

An UP execution management module 308 is a module for managing a user program to be executed in the respective processor. It transfers the message received from either the network or terminal to the UP, and proceeds to send data from the UP to either the network or terminal. A sending SI table 315 is a table for storing contents of the SI part of the message with the CC response which the UP execution management module 308 sends to the network for storing in an output message area. The UP execution area 311 is a part for loading from and executing the UP. A source SI table 316 is a table for storing information about a source which executes the UP in itself, that is, a table for storing contents in the SI part of the message which starts the respective UP.

A file management table 309 and a file management module 312 are tables for managing access to files in the respective disk. A printer management module 318 is a module for managing printer outputs.

Figure 4:
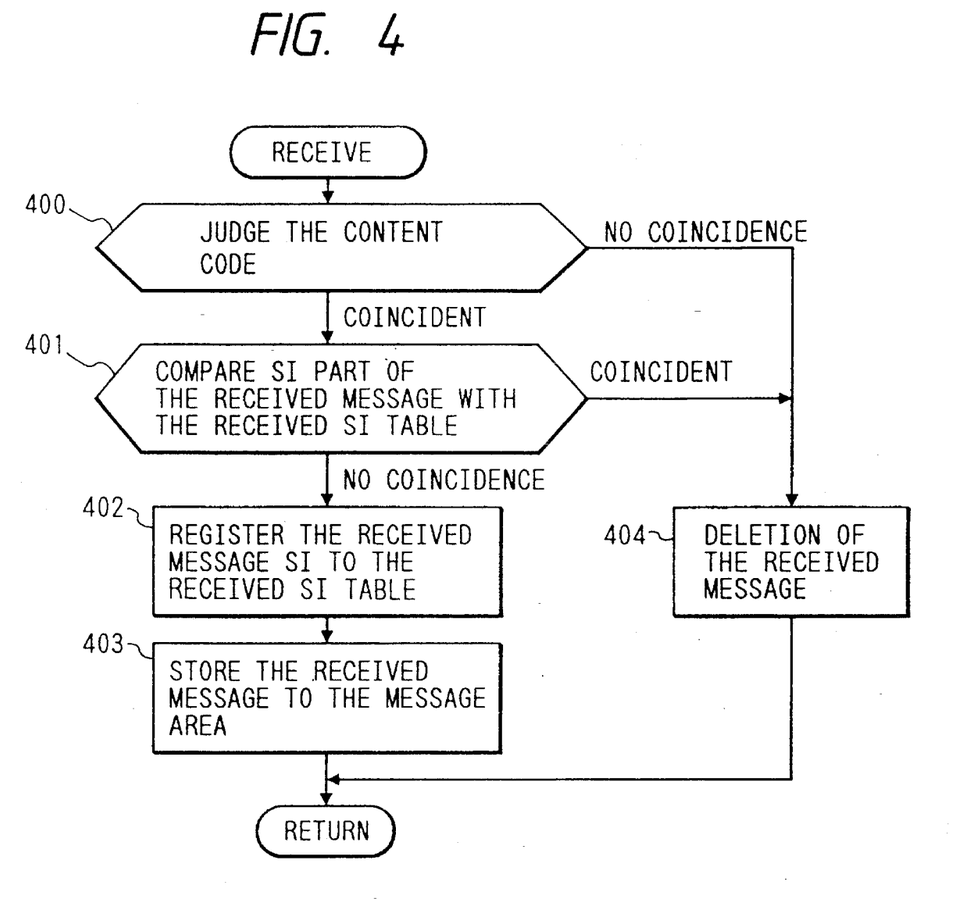
FIGS. 4, 5, 6(a), 6(b), and 6(c) are flow diagrams and system configurations illustrating a first embodiment of the present invention.

In turn, the following describes how the transmission management module 302 (FIG. 3) processes upon reception of a message from the network by reference to FIG. 4. The transmission management module having received the message through the network interface 301 shown in FIG. 3 compares the content of the CC part of the received message with those of the contents code table 303 (FIG. 3) first (step 400). If no coincidence is registered in the content code table 303, the received message is deleted (step 404). Then, judgement is made as to whether contents coinciding in the CC areas and SI part of the received message are registered in the receiving SI table 304 (FIG. 3) (step 401). If there are coincident contents, the received message is deleted since the same message has already been received (step 404). If not, since the received message is a new message, its CC part and SI part are registered in the receiving SI table 304 (step 402). Then, the received message is stored in the input message area 305 (FIG. 3). This process is also executed for messages in the output message area (FIG. 3).

Figure 5:
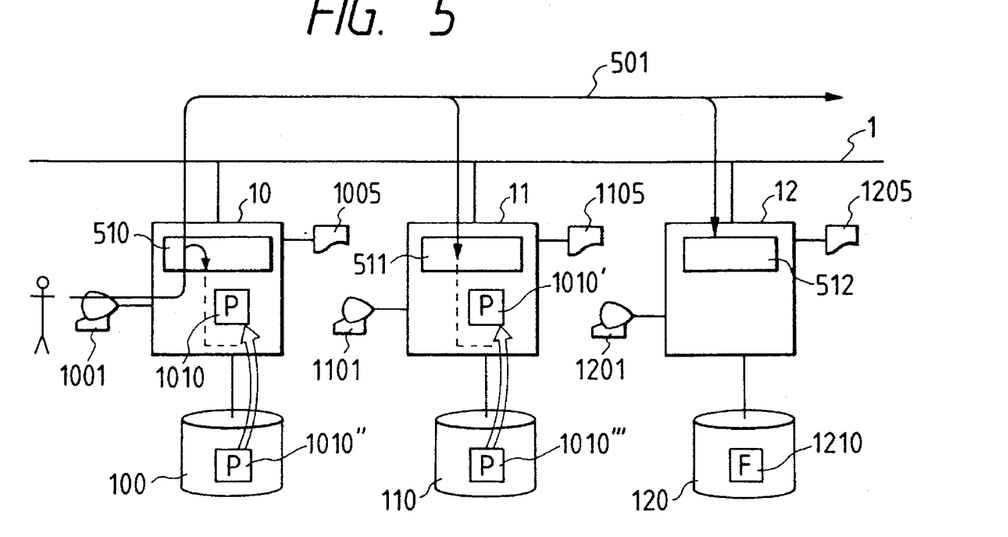

The following describes a first embodiment of the present invention by reference to FIGS. 5 to 9. First, starting process of the UP is illustrated in FIG. 5, which shows a message flow upon starting the UP. Let an operator start the UP from the terminal 1001 of the processor 10.

(1) Generation of an UP Start Message

A program start command entered from the terminal by the operator is taken through the terminal management module 310 (FIG. 3) in the UP execution management module 308 (FIG. 3). Note that the whole system software including the management modules and tables shown in FIG. 3 is denoted by one of blocks 510, 511, 512, and so forth in FIG. 5. The UP execution management module 308 having received the program start command from the terminal creates a message of the format, comprising the CC part 22, the SI part 25, and the data part 26 indicated in FIG. 2, and stores it in the output message area 306. In the creation, the Parts are set as follows.

① CC part :
 . FNM part ... A program name specified by the terminal.
 . ID part ... A code indicated in the access request.

② SI part :
 . PNO part ... Own process number.
 . TNO part ... A task number of the UP execution management module.
 . SN part ... Sequential number in the processor 10.
 . TM part ... Message creation time.

③ Data part: A parameter needed for program execution.

Information about a file the UP accesses and the printer should be specified at the start of the program. The information is set in the data part of the message generated.

The message stored in the output message area 306 through the above process is sent to the network 1 (FIG. 5).

(2) Start of the Program

Assume that the UP directed to start in step (1) above, as shown in FIG. 5, exists in the disks for the processors 10 and 11 as 1010" and 1010'". The content code table 303 (FIG. 3) in each of the processors 10 and 11 has the content code formed of the program name (FNM part) and the access request code (ID part) registered therein. The registration should have been made in advance of system construction or the like. Thus, the start message 501 broadcast to the network in step (1) is stored in the input message area 305

(FIG. 3) in the processors 10 and 11, each through the transmission management module process shown in FIG. 4. The UP execution management module 308 having taken the start message from the input message area 305 loads the given program 1010" for the processor 10 and 1010'" for the processor 11 into the UP execution area 311 from the disks for execution. In the execution, the UP execution management module 308 performs the following two processes.

(i) Registers contents of the SI part of the start message in the source SI table 316 (FIG. 3) to be made applicable to the started program.

(ii) On the basis of the parameter information in the data part of the start message, the content code table has the content code corresponding to the file which the started program accesses or the printer registered therein, or the table has the CC having the file name or printer code in the FNM part and having the access response in the ID part registered therein. Note that registering the content code corresponding to file a or printer may not always be made at the start of program, but can be made on file access in execution of the program or at the output to the printer.

The information registered in the above processes (i) and (ii) are deleted by the UP execution management module 308 at the end of UP execution.

With the UP start process described in FIG. 5, the processors 10 and 11 start the same programs 1010 and 1010' asynchronously as the start command is input from the terminal 1001. For the programs P in the processors 10 and 11, the same information is registered in the source SI table 316 (FIG. 3). In the method according to the present invention, the same information is used to identify the replicated output messages from the replicated programs being executed asynchronously.

Further, the following describes the first embodiment of the present invention with use of an example of the file access process from the UP being executed in the replication way.

Figure 6A:
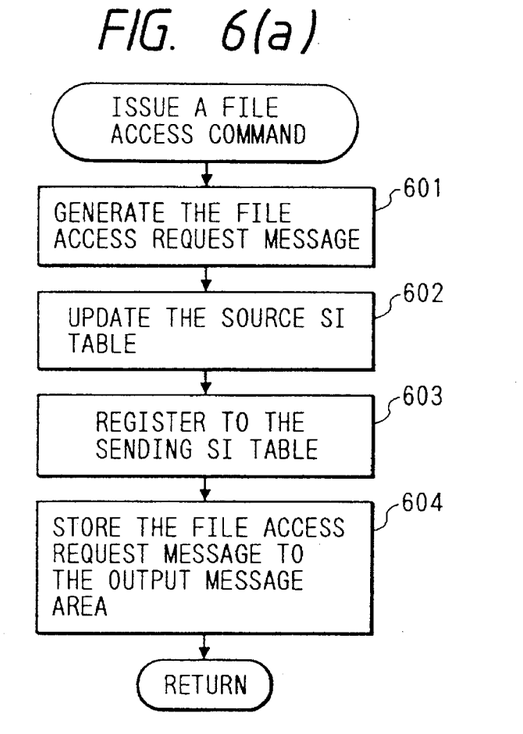

FIG. 6 is a process flow by the UP execution management module 308 (FIG. 3) when the UP issues a file access command, such as open, read/write, close, in execution. In FIG. 6(a), the file access command issued by the UP in execution, is taken by the UP execution management module 308. This module creates a message of the format, comprising the CC part 22, the SI part 25, and the data part 26 indicated in FIG. 2, (step 601). In the creation, the parts are set as follows.

① CC part :
  . FNM part ... A file name specified by the terminal.
  . ID part ... A code indicating the access request.

② SI part :
  . PNO part   Sets a value registered in the
  . TNO part ... source SI table to respond to
  . TM part    the UP issuing the access
  . SN part    command.

③ Data part: Access contents specified by the UP.

In turn, value of 1 is added to the SN part of the SI information, including the PNO, TNO, SN, and TM, applicable to the access command issuing UP of the source SI table (step 602). The contents of the CC part and the SI parts set in step 601 are registered in the sending SI table 315 (step 603). The message generated in step 601 is stored in the output message area 306 (step 604). The UP having issued the file access command in the process in FIG. 6(a) is delayed. The message stored in the output message area 306 in step 604 is broadcast to the network by the transmission management module 302.

Figure 6B:
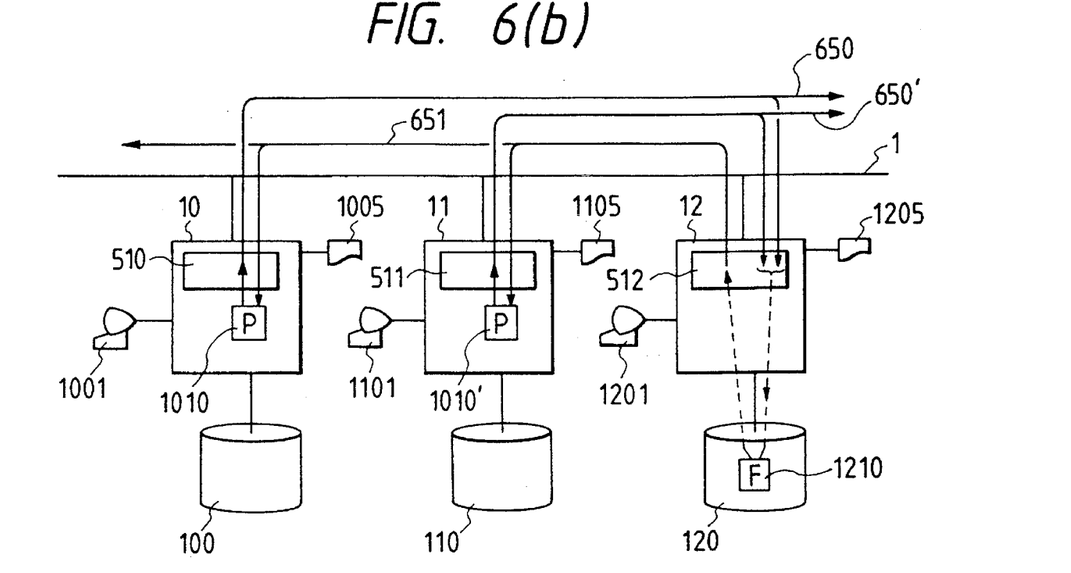

The message flow is described below with an example that the replicated programs P 1010 and 1010' being asynchronously executed in the processors 10 and 11, as shown in FIG. 6(b), accesses a file F1210 of the processor 12. The process shown in FIG. 6(a) is asynchronously executed in the processors 10 and 11. As a result, messages 650 and 650' having the identical CC part, SI part, and data part are broadcast to the network. Both messages are taken by the processor 12. Only the message received first by the processor 12, however, is stored in the input message area 305 by the transmission management module process shown in FIG. 4. The message received later is ignored. The processor 12 accesses the file F1210 on the basis of the contents of the message in the input message area 305, generates the next response message 651, broadcasts it to the network.

① CC part :
  . FNM part ... An accessed file name.
  . ID part   ... A code indicating the access response.

② SI part :   The same value as in the SI part of the access request message.

③ Data part:  Data as a result of access.

Figure 6C:
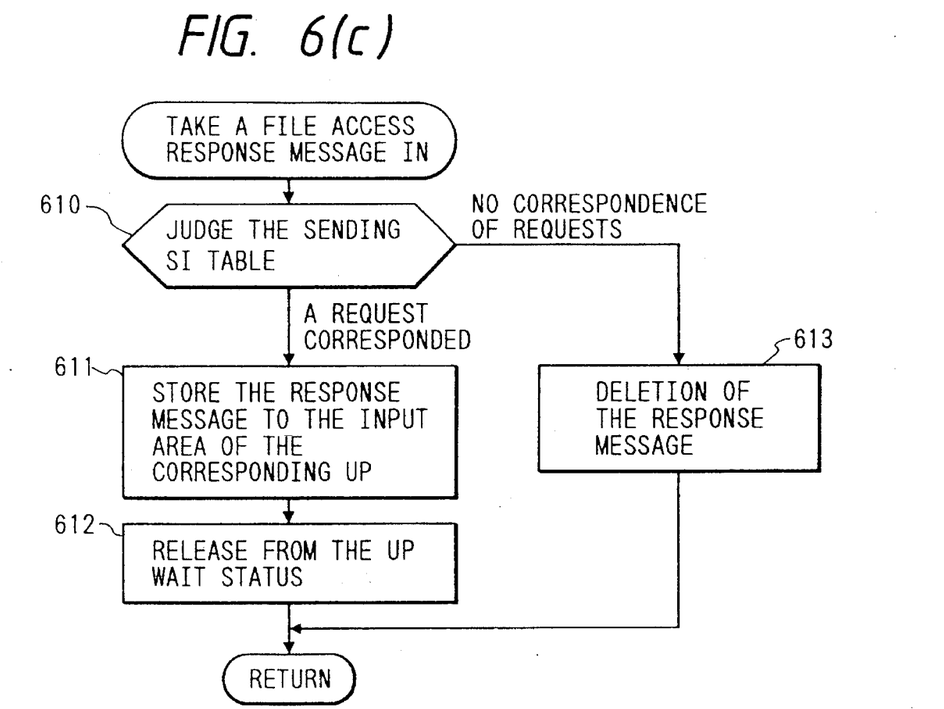

The message 651 is received in the processors 10 and 11. FIG. 6(c) is a process flow chart of the UP execution management module 308 after the message 651 was taken in. The process judges whether the CC part and SI part of the message stored in the input message area 305 (FIG. 3) are registered in the sending SI table 315. If not, the message is deleted (step 613). If so, contents of the data part of the message is set in the and the UP input area of the applicable UP (step 611), is released from the wait status (step 612).

With the process described above, the existing UP can be asynchronously executed by the plurality of processors as it stands. However, this is only when minor deviations exist between start times and process execution times between the replicated programs being executed by different processors. If the deviations are too large, a problem shown in FIG. 7 occurs.

Figure 7:
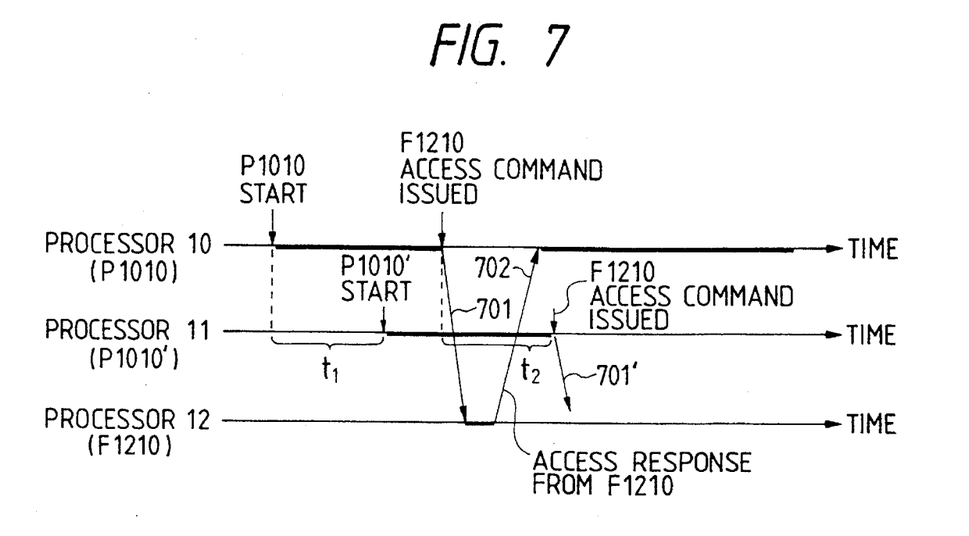
FIG. 7 is a timing chart illustrating occurrence of a problem in the first embodiment.

FIG. 7 is a time chart for indicating the executions of the programs P 1010 and 1010' in the processors 10 and 11 shown in FIG. 1 and the access process by the programs to the file F 1210 in the processor 12. Assume that as shown in FIG. 7, the start of the program P 1010' is $t_1$ later than that of program P 1010 in the processor 10 because of high load in the processor 11. As a result, the access process of P 1010' to F 1210 is $t_2$ later than P 1010. If the processor 12 has finished the access process for the file access request of P 1010 within the delay $t_2$, or if it has sent an access response 702, then the processor 11 ignores the access response 702 as it receives no access request yet. A file access request 701' of P 1010' in the processor 11 is also ignored as the processor 12 has already processed it. Consequently, as no response is generated for the access request of the program P 1010', this stops at fault.

Figure 8A:
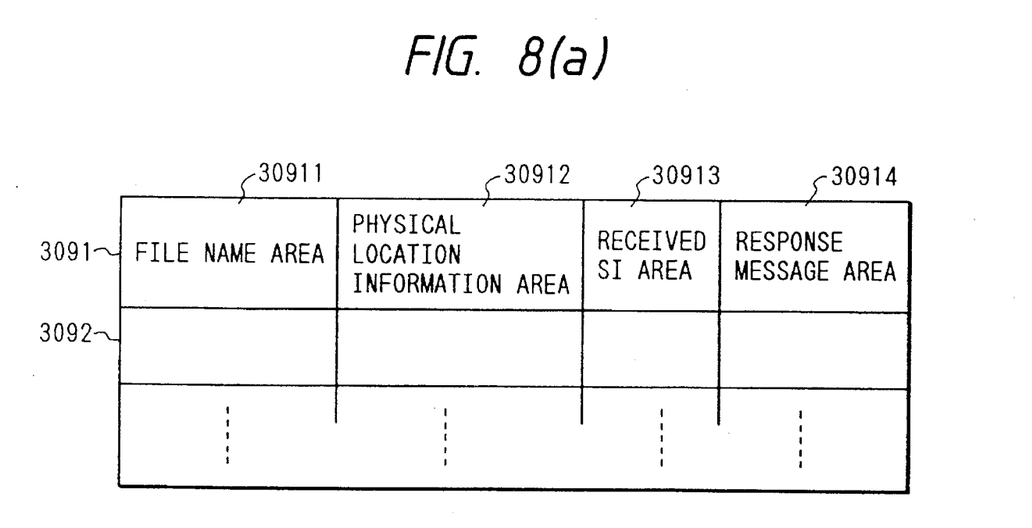
FIGS. 8(a) and 8(b) are a chart and flow diagram, respectively, illustrating a second embodiment of the present invention.
Figure 8B:
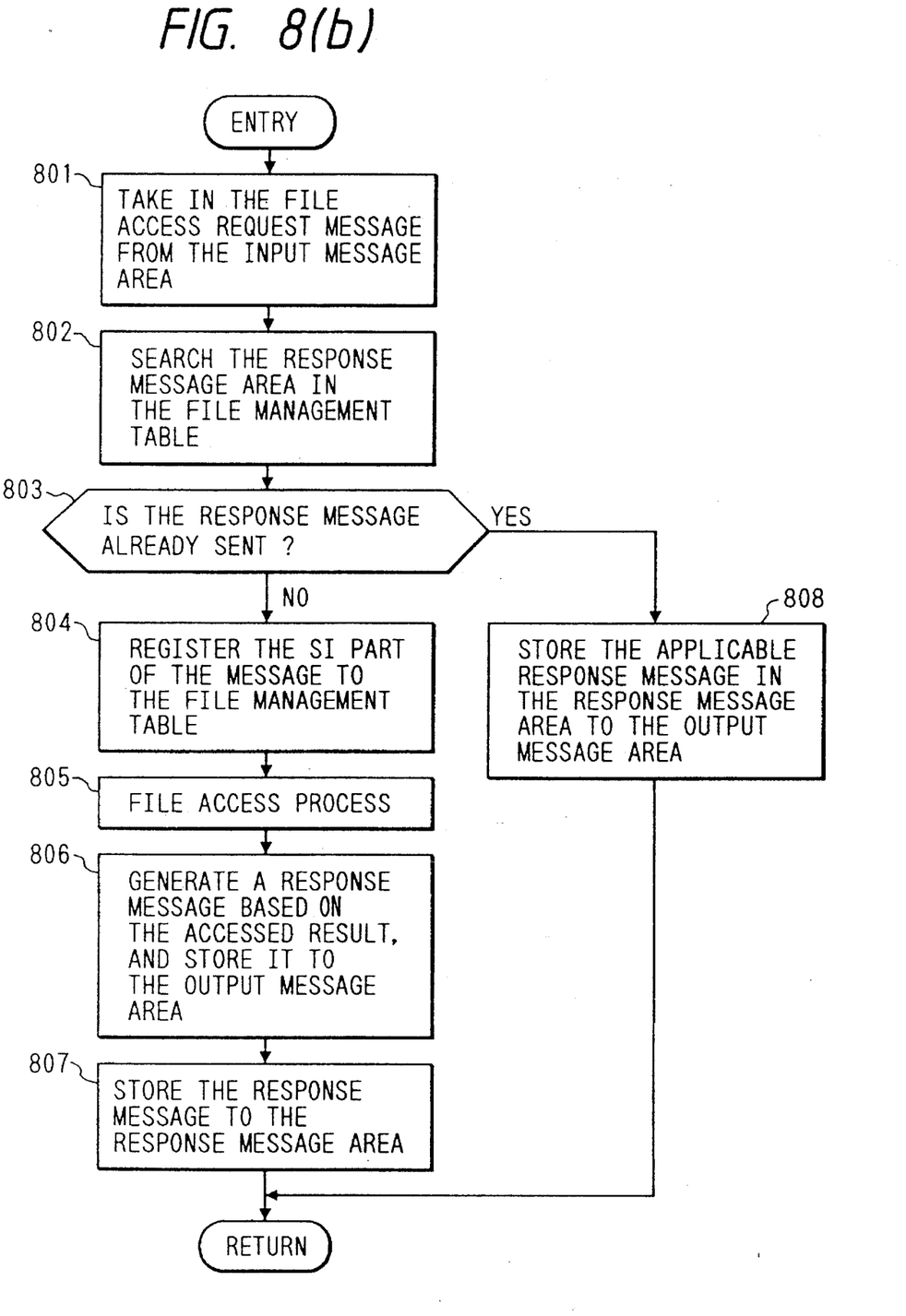

In turn, the following describes a second embodiment of the present invention for a method for solving the problem mentioned above by reference to FIG. 8.

FIG. 8 shows an illustrative chart and flow diagram for the process in the file management module 312 in FIG. 3. FIG. 8(a) is the chart showing contents of the file management table 309 in FIG. 3. The file management table 309 is formed of information storing areas 3091, 3092, and so forth for the respective files stored in the own disk. The area 3091 is formed of an area 30911 for storing a file name, an area 30912 for storing information of a file physical location indicating in what disk and where the file is, an area for storing the SI part of the access request message for the file, and an area 30914 for storing a response message as a result of the access process. The area 30914 is capable of storing the number of response messages determined in advance. It erases the oldest message if the messages exceed the predetermined number. The areas 3092 and so forth are identical with the area 3091. The SI part of the response message, as also mentioned in the first embodiment, has the value of the SI part of the applicable access request message set therein.

In turn, the following describes the process by the file management module 312 (FIG. 3) by reference to FIG. 8(*b*). First, the file management module 312 takes the file access request message from the input message area 305 (FIG. 3) (step 801). Secondly, it searches the file management table shown in FIG. 8(*a*), and detects an area which has the same file name as that of the FNM part 221 (FIG. 2) of the CC parts of the taken access request message. Thirdly, it searches whether or not a response message area of the detected area has a response message having the same value of the SI part as the taken access request message (step 802). If not, control moves to step 804 as the taken access request message has not yet been processed (step 803). Step 804 stores the value of the SI part of the access request message into the receiving SI area of the corresponding area of the file management table. Fourthly, it carries out the request file access process (step 805), generates a response message on the basis of the access results, and stores it in the output message area 306 (FIG. 3) (step 806). The SI part of the response message has the value of the receiving SI part of the file management table set in step 804. Fifthly, it stores the generated response message into a corresponding response message area of the file management table (step 807). This completes the process.

The following describes the process when the response message having the same value of the SI part is stored in step 803, or when the taken access request message has been already processed. In this case, control moves to step 808. The response message having the same value of the SI part in the response message ar ea of the file management table is stored in the output message area 306 (FIG. 3) (step 808). This completes the process.

The response messages stored in the output message area 306 in steps 806 and 808 are sent out to the network by the transmission management module.

With the file management module process described above, if the same program is asynchronously executed, the response message having the same contents is output to respond to the file access request each program generates. When receiving the plurality of response messages, the processor will carry out steps 401 and 402 of the reception process flow shown in FIG. 4 for the plurality of response messages, and, it stores only the first received response message into the input message area 305 (step 403).

With the method described above, even if as shown in FIG. 7, the execution timing deviates much between the replicated programs, the processor having the file for each of the access request messages generated by the replicated programs can generate the response messages having the same contents. And each access requesting processor receives only one of the response messages, each of the replicated execution programs can continue the process normally. It is advantageous in that the response characteristic can be increased as the actual file access process is made only once when the first access request is received.

Figure 9A:
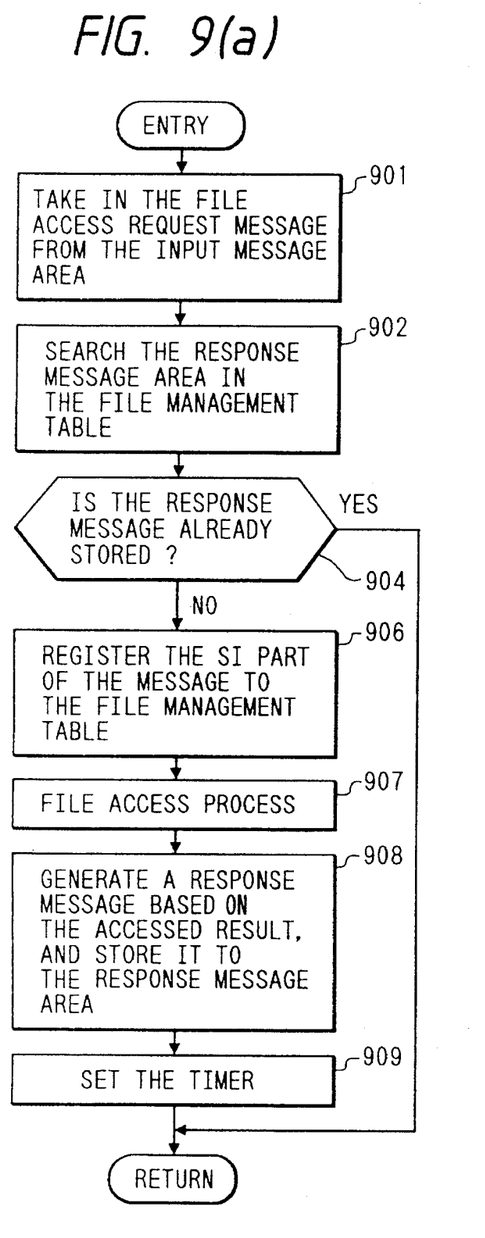
FIGS. 9(a) and 9(b) comprise a flow diagram illustrating a third embodiment.
Figure 9B:
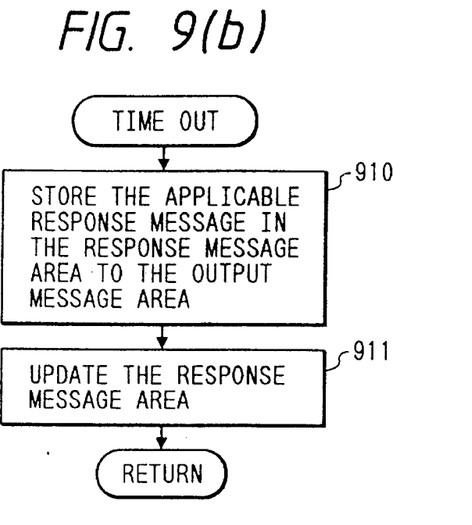

In the method given in the second embodiment, the file management module 312 should return a response for each reception of the access requests generated by the replicated execution programs. Alternatively, the problem in FIG. 7 can be solved in a way that the response is returned at the time when all access requests of the replicated execution programs are received. Such an alternative method will be described below as the third embodiment by reference to FIG. 9.

FIG. 9 comprises flow diagrams showing the process of the file management module 312 in FIG. 3. Steps 901 and 902 at the time of reception of the file access request message are identical with steps 801 and 802 mentioned in FIG. 8(*b*). If in step 902, the response area of the file management table has no response message having the same value of the SI part as the received access request message, control moves to steps 906 and 907 as the received access request message has not yet been received. Steps 906 and 907 are identical with steps 804 and 805 mentioned in FIG. 8(*b*). Step 908 also is same as step 806 in FIG. 8(*b*) except that the generated response message is stored in the response message area of the file management table, but not in the output message area. In other words, the third embodiment, unlike the second embodiment, will not send the response message to the network even after the process end of step 908. After the process end of step 908, a timer is set for the stored response message (step 909).

If in step 904, the response message having the same value of the SI part as the received access request message is stored in the response message area of the file management table, then the process ends as the access request message has been received.

In turn, the following describes a process at the end of the time set in step 909 by reference to FIG. 9(*b*). At the end of the time, a response message corresponding to the time set in the response message area of the file management table is stored in the output message area 306 (FIG. 3) (step 910). Then the response message is deleted from the response message area (step 911). With this process, the response message is sent to the network at the time-out.

With the method described above, even if as shown in FIG. 7, the execution timing deviates much between the replicated execution programs, the response is generated at the time of file access request of the latest program. This is advantageous in that each of the replicated execution programs can continue the process normally. In the method, also, the file management module carries out the file access process to create the response message at the time when the first access request is received. Therefore, only the created response message is to be sent to the network when the final access request is generated. This is also advantageous in that the response characteristic can be increased.

In the third embodiment, the response message is sent to the network in a certain time after the first access request message is received. Alternatively, the response message may be sent to the network after a certain quantity of access request messages are received.

The second and third embodiments described above use the file management module to solve the problem showed in FIG. 7. Instead, they may use the UP execution management module 308 (FIG. 8). Such an alternative method will be described below as the fourth embodiment. The file management module process in the fourth embodiment is identical with the one in the first embodiment.

First, the following describes the process by the UP execution management module at the time of reception of the file access response message by reference to FIG. 6(c) given in the first embodiment. The process at the reception of the response message in the fourth embodiment is different only by step 613 in FIG. 6(c). That is, in the first embodiment, the received response message is deleted if the access request message for the received response message is not registered in the sending SI table, or if the respective processor has not sent the corresponding access request message. In the fourth embodiment, on the other hand, the received response message is not deleted and an additional response message storage area is provided to store this received response message even in that case.

Figure 10:
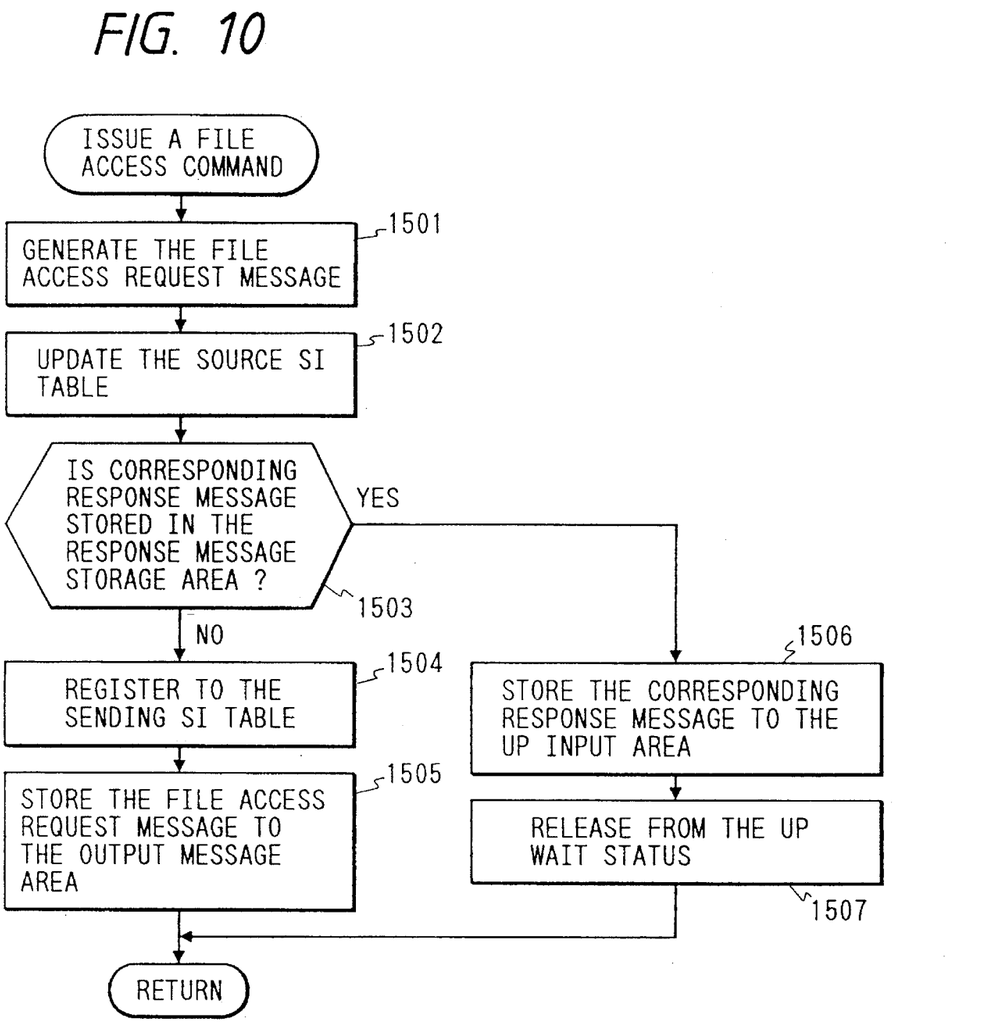
FIG. 10 is a flow diagram illustrating a fourth embodiment.

In turn, the following describes the process by the UP execution management module when a program issues the file access command by reference to FIG. 10. The figure is the same as FIG. 6(a) in the basic process. The only steps different from FIG. 6(a) are explained below. Steps 1501, 1502, 1504, and 1505 are identical with steps 601, 602,603, and 604 in FIG. 6(a). The UP execution management module generates a file access request message corresponding to the file access command issued by a program (step 1501). It updates the source SI table (step 1502). After this, it judges whether or not the response message corresponding to the access request created in step 1501 has been stored in the response message storage area mentioned above (step 1503). This is made by searching whether the response message having the same contents of the SI parts as the access request message exists in the response message storage area. If so, the response message is stored in the input area of the corresponding UP as it is (step 1506). The UP wait status is released (step 1507). In other words, if the response message corresponding to the created request message has already been received, the request message is not sent to the network, but the process is continued with use of the already received response message.

With the fourth embodiment described above, even if as shown in FIG. 7, the execution timing deviates much between the replicated execution programs, any of the programs can receive the response message for the file access request. If the file access process corresponding to the file access request generated by the program in the own processor has already been made, also, any of the processors can receive the response message in advance. If the respective program issues the access request, the processor will not carry out actual file access process, but uses the response message received in advance. This is also advantageous in that the response characteristic can be increased.

In the above mentioned first to fourth embodiments has been described the case that the program accesses to the file. Of course, the program is not be limited to access the file, but can access to the terminal, printer, and similar externally connected devices in right the same way.

From the description so far given, the system according to the present invention having the plurality of processors connected through the network can have programs executed in any of the processors at any of the degree of replication. This increases the flexibility of the system.

Also, in accordance with the present invention, the access command issued by any of the programs can be automatically converted to contents code message to broadcast to the network. Any existing program therefore can be used as it is without creating a special software.

Many different embodiments of the present invention may be constructed without departing from the spirit and scope of the invention. It should be understood that the present invention is not limited to the specific embodiments described in this specification. To the contrary, the present invention is intended to cover various modifications and equivalent arrangements included within the spirit and scope of the claims.

We claim:

1. A data management method in a distributed processing system having a plurality of processors connected through a common transmission path with at least a first processor having at least one external device connected therewith, said method comprising the steps of:

asynchronously executing a same program, in processors other than said at least first processor, utilizing same data and having same results, said same program being stored in said processors other than said at least first processor;

sending to the common transmission path an access message including an access command issued from each of the others of said plurality of processors to the external device by the asynchronously executed program;

receiving the access messages from the others of said plurality of processors into the first processor when the access messages are related to the external device; and determining an order of access to the external device in said first processor by coordinating the received access messages in the order in which the access messages are received.

2. A data management method in a distributed processing system according to claim 1, wherein said external device is a disk drive.

3. A data management method in a distributed processing system having a plurality of processors connected through a common transmission path, said method comprising the steps of:

(a) sending, from a first processor to said common transmission path, a starting message requesting starting of a program, along with management information to be used for execution management of said program;

(b) receiving said starting message into a plurality of second processors having said program, for processing said program in each of said plurality of second processors, wherein each of said second processors processes said same program utilizing same data and having same results;

(c) receiving and holding said management information in correspondence with said same program, in each of said second processors;

(d) asynchronously sending, from each of said second processors to said common transmission path, a request message with said management information for utilizing information in a third processor;

(e) receiving, in said third processor, said request message with said management information, from each of said second processors, through said common transmission path; and (f) executing in said third processor, at least one process requested in said request message from one of said second processors based upon the received management information.

4. A data management method according to claim 3, wherein said one of said second processors in the step (f) is selected from the plurality of second processors by coordinating every request message from each of said second processors.

5. A data management method according to claim 3, wherein said step (a) includes the step of generating said management information including identification information for identifying said first processor.

6. A data management method according to claim 3, wherein said at least one process being a process requested by a request message received from said plurality of second processors, and executed upon reception of the first received request message, said step (e) further comprising steps of:

holding a result of execution of said at least one process;

sending said result as a message responding to said first received request message; and sending the held result to said common transmission path as a response message responding to each request message other than said first received request message, upon reception of such each request message.

7. A data management method according to claim 3, wherein said at least one process being a process requested by a request message received from said plurality of second processors, and executed upon reception of the first received request message, said step (e) further comprising steps of:

holding a result of execution of said at least one process; and sending the held result to said common transmission path as a response message, after a predetermined time passes from reception of said first received request message.

* * * * *